United States Patent Office 3,733,389
Patented May 15, 1973

3,733,389
METHOD FOR THE MANUFACTURE OF ALKALI CHROMATE FROM A CHROME ORE
Keizo Honbo, Anan, Japan, assignor to Nippon Denko Kabushiki Kaisha, Tokyo, Japan
Filed July 14, 1971, Ser. No. 162,436
Claims priority, application Japan, Aug. 31, 1970, 45/75,905
Int. Cl. C01g 37/14
U.S. Cl. 423—53
2 Claims

ABSTRACT OF THE DISCLOSURE

A method for manufacturing alkali chromate in a rotary kiln by roasting the material which includes chrome ore, caustic alkali, alkali carbonate and slaked lime, etc. In a process for roasting the said material wherein the said material is passed through a horizontally inclined rotary kiln from its raised end, while passing into the low end the improvement comprises blowing an oxygen containing gas against the said material in the direction opposite to the flow of the said material in the oxidizing zone of the kiln so as to scatter a part of the said material coming down thereto, resulting in the promotion of the oxidizing roasting, etc.

BACKGROUND OF THE INVENTION

This invention relates to a method for manufacturing the alkali chromate from the chrome ore.

It is the current commercial practice that the chrome ore is pulverized into a finely divided form, which is then mixed with the caustic alkali and the alkali carbonate, and if desired, such powdery additives as lime, dolomite and the residue of extract from the chrome ore, etc., to form a mixed material in a powdery or pelletized form, and the material is subjected to oxidizing roasting by the use of a rotary kiln so as to convert the chromium value in the ore into the alkali chromate.

In this conventional practice, the combustion of such fuels as heavy oil, gas, coal, etc. is utilized and the combustion flame and the combustion gas at high temperatures will heat the material in the kiln while the oxygen existing in excess effects oxidation thereof. The temperatures at which the oxidation of the material takes place vigorously range between 1000° C. and 1200° C. The reaction will slow down rapidly at 1000° C. or below. At temperatures above 1200° C., a part of the reaction product will melt out to form a thin film over the surface of the material which prevents the oxygen from penetrating into the inside of the material and thus the slow-down of the reaction takes place as with the case of the low temperatures of 1000° C. or below. Moreover, the mixed material becomes more sticky and thus such phenomenon that the mixed material tends to adhere or deposit on the wall of the kiln takes place. In an elongated rotary kiln in which the combustion takes place at one end and the exhaust gas is discharged from the other end, the zone wherein the moving material can be kept at the temperatures suitable for the reaction, i.e. 1000 to 1200° C. must be limited. Moreover, the mixed material is too difficult to control so as to keep the same in the suitable range of temperatures for a long period, since it has to be passed through exothermic reaction and endothermic reaction in the course of roasting. As for the gaseous atmosphere, the oxygen contained therein becomes little since the oxygen is consumed in the kiln by combustion of gas for direct heating. These factors synergistically exert an adverse effect upon the oxidizing reaction.

It has been proposed as a counter-measure thereto to decrease an amount of the material fed so as to slow down the moving velocity of the material and thus promote the oxidizing reaction. When an amount of the material fed is decreased, the length of the zone wherein optimum temperatures for reaction are maintained can be increased and the time for reaction can thus be increased while an amount of combustion can be decreased so that the concentration of the oxygen in the combustion gas can be increased, which results in the remarkable promotion of the oxidizing reaction of the material. On the other hand, however, the capacity of the kiln for treating the material is lowered with an economically adverse result. Accordingly a compromise has heretofore been made that an amount of the material treated is increased at a sacrifice of the reaction to a certain extent.

It is therefore an object of the invention to enhance the yield of the chromate and the capacity of the rotary kiln for roasting the material by promoting the oxidizing roasting reaction in the alkali oxidizing roasting of the chrome ore in the said kiln.

SUMMARY OF THE INVENTION

In accordance with the present invention there is provided a method for the manufacture of alkali chromate from the chrome ore material which comprises providing a blast nozzle in the zone of a rotary kiln where the oxidizing reaction is taking place, blowing an oxygen-containing gas from the said nozzle to the material moving through the inside of the kiln in a direction opposite to the flow of the said material thereby scattering a part of the material while effecting the oxidizing reaction and recovering the product.

The present invention is based upon the discovery that if a blast nozzle which is directed toward the reaction zone in the rotary kiln is provided, and an oxygen-containing gas such as air, oxygen or oxygen-enriched air is blown from the nozzle to the mixed material coming down thereto in the kiln in a direction opposite to the flow of the said material so as to effect roasting while scattering a part of the said material, it is possible to accomplish a sufficient reaction and thus enhance a roasting capacity of the kiln to a great degree.

In the practice of the present invention, the mixed material which has reached to the blowing area of the blast nozzle is exposed to a gaseous atmosphere having a high concentration of oxygen while it is brought to a fluidized condition by means of the blowing power of the gas so that the roasting reaction which is the oxidizing reaction will be remarkably promoted. It has also been observed in the present invention that even the material which is exposed to such a temperature as to cause local melting is allowed to cool when it meets the blowing gas, and the melting of the material is thus prevented, which results in accelerating the oxidizing reaction. It is noted that this cooling effect also serves to substantially prevent a phenomenon which is called "ring formation" that the mixed material is caused to deposit on the wall of the kiln at high temperatures.

Accordingly, it is possible to enlarge the reaction zone by increasing an amount of heat generating from the burner, which will, in turn, make it possible to increase the roasting capacity of the rotary kiln. Moreover, a part or substantial part of the mixed material is scattered in a direction opposite to its moving direction, which then repeatedly approaches to the blowing position of the nozzle, and finally moves to the discharge end of the kiln therebeyond. As a result, the amount of the mixed material residing in the reaction zone is naturally increased while the residence time of the said material in the said zone is also prolonged so that the roasting reaction can be fully promoted and the roasting capacity of the rotary kiln is extremely increased.

It is preferable in the practice of the present invention that the mixed material be pelletized before it is charged into the rotary kiln, but it is of course possible, chiefly from the economical point of view, to charge the same in a pulverized or finely divided form such as powders. This is because a phenomenon of partial sintering occurs in the mixed material, which will result in agglomeration thereof and thus raise no substantial problem in the practice of the invention.

As set forth hereinabove, the present invention has outstanding advantages of prolonging the residence time of the mixed material in the reaction zone, increasing the roasting capacity of the kiln by means of supplying a fully oxidizing gaseous atmosphere to the mixed material and enhancing the yield of chromate by promoting the roasting reaction.

DETAILED DESCRIPTION OF THE PREFERRED EMBODIMENTS

Figure 1:
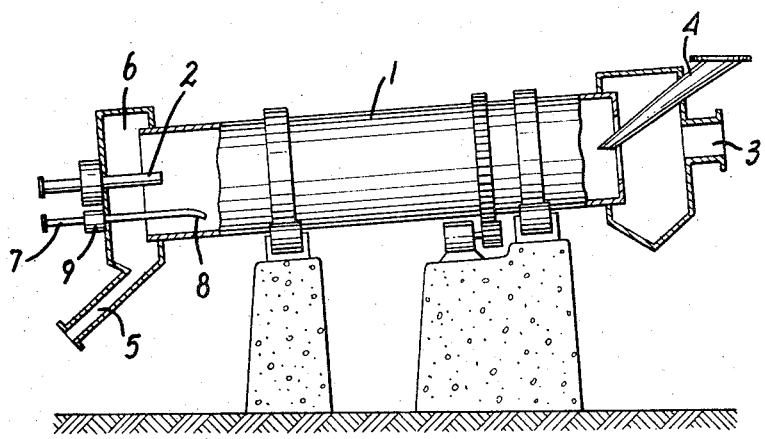
FIG. 1 is a front view schematically showing an example of the apparatus or rotary kiln adapted for use in the present invention.
Figure 2:
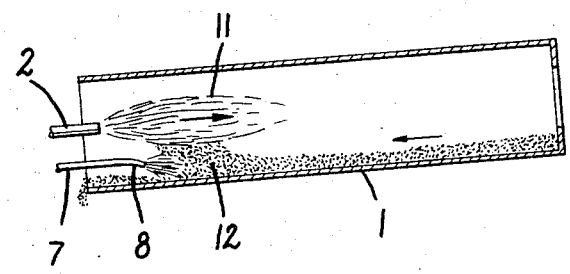
FIG. 2 is a view showing a direction of flow of the material and that of the gas inside the kiln of FIG. 1.

In FIG. 1, a rotary kiln 1 of a counter-current type is shown, which is provided with a burner 2, an outlet 3 for exhaust gas and a chute 4. The mixed material is charged into the kiln 1 through the chute 4. The material thus charged is at first dried, then allowed to increase its temperature and finally discharged from an outlet 5 of the kiln. The outlet 5 is fixed to a stationary hood 6 which is in turn fixed to the body of the kiln 1. A blast pipe 7 is extended through the hood 6 into the interior of the kiln 1 so that the blast nozzle 8 of the pipe 7 is placed directly below the flame 11 (see FIG. 2) of the burner 2 or thereabout. The pipe 7 is fixed to the hood 6 by means of a support 9 which is capable of effecting some adjustments with respect to the lengthwise position of the nozzle 8 and the direction of blowing of gas. The air, oxygen or oxygen-enriched air having suitable pressure is then blown from the nozzle 8 having a proper caliber, shape and direction of blowing to the part of the mixed material 12 that has reached the maximum temperature in the kiln in a direction opposite to the flow of the material and obliquely and downward to the said part of the material. A part or substantial part of the mixed material is thus caused to scatter in a direction opposite to the flow of the material whereby the concentration of the oxygen in the reaction zone is increased, the mixed material is kept under fluidized conditions, the mixed material which tends to be overheated and viscous is allowed to cool to a necessary extent, the amount of the said material residing in the reaction zone is increased and the residence time of the said material therein is also prolonged.

The invention is further described in the examples below. In the following examples, parts and percentages are by weight unless otherwise stated.

EXAMPLE I

A rotary kiln as shown in FIG. 1, having a diameter of 700 mm., a length of 10 m., and a gradient of 3/100 was used. The mixed material in the form of pellets made of 22 parts of powdery chrome ore from South Africa (containing 53% of $Cr_2O_3$), 12 parts of soda ash, 5 parts of caustic soda, 22 parts of slaked lime and 30 parts of powdery residue of extracts was charged to the kiln at the rate of 150 kg./hr. and subjected to oxidizing roasting according to both the conventional method and the present invention. When the oxidizing roasting was effected according to the present invention, a blast nozzle was positioned about 2.5 m. apart from the outlet end of the kiln, from which the air having a pressure of 5 kg./cm.$^2$ was blown at the rate of 1.5 m.$^3$/min. in a direction opposite to the flow of said material and obliquely and downward to the said material. The analysis of the sintered products was as follows:

(1) According to the conventional method:

Total Cr _____ 16.2% (as Cr).
Sodium chromate _____ 9.1% (as Cr).

(2) According to the method of this invention:

Total Cr _____ 16.1% (as Cr).
Sodium chromate _____ 11.7% (as Cr).

EXAMPLE II

A rotary kiln as shown in FIG. 1, having a diameter of 3,000 mm., a length of 45 m., and a gradient of 3.5/100 was used. The mixed material in the form of pellets made of 22 parts of powdery chrome ore (containing 53% of $Cr_2O_3$), 18 parts of soda ash, 22 parts of slaked lime and 30 parts of powdery residue of extracts was charged to the kiln at the rate of 6 t./hr. and subjected to oxidizing roasting according to both the conventional method and the present invention. When the oxidizing roasting was effected according to the present invention, a blast nozzle was positioned about 5 m. apart from the outlet end of the kiln, from which the air having a pressure of 5 kg./cm.$^2$ at the rate of 10 m.$^3$/min. in a direction opposite to the flow of the said material and obliquely and downward to the said material.

In the both methods, an amount of the fuels consumed per unit time was kept to constant and the air was consumed in an amount twice as much as its theoretical amount required to burning. The analysis of the sintered products was as follows:

(1) According to the conventional method:

Total Cr _____ 16.2% (as Cr).
Sodium chromate _____ 8.9% (as Cr).

(2) Accordng to the method of this invention:

Total Cr _____ 16.2% (as Cr).
Sodium chromate _____ 11.5% (as Cr).

EXAMPLE III

The same test was repeated as in the Example II, except that the material was charged to the kiln at the rate of 7 t./hr. and that in case of the method according to this invention an amount of the fuels and the air required to burning was increased by 10% (by the volume) each. The analysis of the sintered products was as follows:

(1) According to the conventional method:

Total Cr _____ 16.4% (as Cr).
Sodium chromate _____ 7.3% (as Cr).

(2) According to the method of this invention:

Total Cr _____ 16.2% (as Cr).
Sodium chromate _____ 11.4% (as Cr).

What is claimed is:

1. In a method for producing alkali chromate from a chrome ore and alkali material containing mixture which comprises charging said mixture into one end of an inclined rotary kiln, moving said mixture in the direction of the other end of said kiln to pass it through a roasting zone therein in which said mixture is roasted under oxidizing conditions by oxygen containing products comprising the combustion gases issuing from a burner unit, the flame of which is directed toward said one end of said kiln to convert the chromium in said mixture to alkali chromate, and recovering the alkali chromate, the improvement which comprises directing a blast of air or oxygen enriched air from a location directly below said flame obliquely downward against said mixture while it is in said zone and counter to the direction of the movement of said mixture in said kiln to scatter said mixture in said counter direction and thereby increase the residence time and amount of said material present in said zone.

2. A method according to claim 1 in which the said material is in the form of pellets.

References Cited

UNITED STATES PATENTS

| | | | |
|---|---|---|---|
| 3,510,256 | 5/1970 | Schafer | 23—56 |
| 3,095,266 | 6/1963 | Lauder et al. | 23—56 |
| 3,488,700 | 1/1970 | Iken et al. | 263—33 R |
| 3,074,707 | 1/1963 | Humphreys et al. | 263—33 R X |
| 2,402,102 | 6/1946 | Udy | 23—56 |
| 3,336,102 | 8/1967 | Hultman et al. | 23—56 |

FOREIGN PATENTS

| | | | |
|---|---|---|---|
| 171,089 | 5/1906 | Germany | 23—56 |

HERBERT T. CARTER, Primary Examiner

U.S. Cl. X.R.

263—33 R